May 18, 1948.   A. M. TAYLOR   2,441,650
TRANSMISSION OF ELECTRIC POWER OVER LONG DISTANCES
Filed Jan. 17, 1945   5 Sheets-Sheet 1

Inventor:
Alfred M. Taylor,
By his attorneys:
Baldwin & Wight

May 18, 1948.  A. M. TAYLOR  2,441,650
TRANSMISSION OF ELECTRIC POWER OVER LONG DISTANCES
Filed Jan. 17, 1945    5 Sheets-Sheet 2

Inventor:
Alfred M. Taylor,
By his attorneys,
Baldwin & Wight

May 18, 1948.                A. M. TAYLOR                2,441,650
TRANSMISSION OF ELECTRIC POWER OVER LONG DISTANCES
Filed Jan. 17, 1945                5 Sheets-Sheet 4

Inventor.
Alfred M. Taylor,
By his attorneys:
Baldwin & Wight

May 18, 1948.   A. M. TAYLOR   2,441,650
TRANSMISSION OF ELECTRIC POWER OVER LONG DISTANCES
Filed Jan. 17, 1945   5 Sheets-Sheet 5

Inventor:
Alfred M. Taylor,
By his attorneys,
Baldwin & Wight

Patented May 18, 1948

2,441,650

UNITED STATES PATENT OFFICE 2,441,650

TRANSMISSION OF ELECTRIC POWER OVER LONG DISTANCES

Alfred Mills Taylor, Birmingham, England

Application January 17, 1945, Serial No. 573,203
In Great Britain February 11, 1944

4 Claims. (Cl. 172—237)

When lines of extreme length are considered, it is found that, under the inventor's Patent No. 2,180,264 (U. S. A.), the lack of a sufficiently rapid response to a momentary increment in line current, in the form of a quadrature leading voltage which is directly, and instantly, proportional to the increment of current, may result in instability.

His subsequent patent application (U. S. A. No. 501,571) largely rectified this weakness by the introduction of so-called "emergency" boosters (both quadrature and inphase); but, even in this case, the boost was not absolutely instantaneous; and an interval of some .06 second had still to elapse before the boost was actually injected at its full value. The inventor calculates that this form of boost will give satisfactory stability up to a distance of 750/1000 miles, when operating at 330 kv. (at receiver end) and transmitting 500,000 kw.

For distances, however, of 1500/2000 miles, the electrical "distortion" in the voltage along the line is so exceedingly rapid that something supplementing the said "emergency" boosters is desirable.

The principal object of the present invention is to overcome the difficulty which presents itself, in the earliest part of the disturbance of line potentials caused by any sudden demand at receiver end (such as the sudden failure of a receiver generator).

If a sudden large change in the line current has to be effected, in order to pass the necessary synchronising (accelerating) current to receiver, a very great number of additional kv.-a. has to be passed over the line; due to the inductance of same.

After a period of .06 to .08 second, there is no great difficulty, because the arrangements of the inventor's British Patent No. 561,775 (U. S. patent application 501,571) are equal to providing a very great increase in the kv.-a. This performance, however, is handicapped because of the reduced period of time which is left during which acceleration has to function (owing to the need for closing certain large switches); thus requiring much heavier accelerating current.

An actual example will prove the point more clearly. For instance, on a "twin" transmission line 1,000 miles long, transmitting normally 500,000 kw. at 330 kv., it is found that the ratio of the reactive (inductive) E. M. F. so required to the normal phase-to-neutral E. M. F. obtaining at the receiving station is of the order of 3 to 1. If the normal power load, per phase, were $500,000 \div 3 = 166,000$ kv.-a. then the normal inductive kv.-a., per phase, would be $3/1 \times 166,000 = 500,000$ kv.-a. And, per 3 phases, it would be 1,500,000 kv.-a. Now, suppose that, in order to produce rapid acceleration at receiver, it is desirable that an increment of 20% of the normal receiver current shall be passed over the line. Since kv.-a. varies as $(IX)^2$, this of course means an additional $(1.2^2-1.0^2) \times 1,500,000 = 600,000$ kv.-a. (leading current) to be instantly provided. In other words, the kilovolts at the sending end must (allowing for 10% ohmic drop in line) be increased from perhaps 363 kv. to $1.2 \times 363. = 435$ kv.; at which pressure corona would be very serious indeed. Moreover, the insulators would fail; and in fact the power proposed to be transmitted would not be undertaken, and would have to be considerably reduced (unless the voltage could be raised).

Now, suppose that it is possible, by employing a special alternator (running empty) at receiver end, attached to a heavy flywheel, to provide the necessary — comparatively small — additional kv.-a., at terminals of receiver, required to restore the deceleration obtaining in the remaining (i. e. the undamaged) receiver generators; this 600,000 kv.-a. of wattless power is immediately rendered unnecessary, and only the pure active power component demanded for acceleration is now required. (Previously, this had to be supplied from the sending end, in addition to the wattless component; involving $I^2R$ drop).

Say, for example, that 100,000 kw. (20% of 500,000 kw.) had to be supplied out of the flywheel inertia, for the first .06 second after the commencement of the momentary increment. This would cause a diminution of speed of the flywheel, and a drop in terminal E. M. F. of the special generator, which is quite unimportant, and can be rectified by the means proposed later in this specification.

The above will show the tremendous gain to be effected by having a store of mechanical rotating energy to draw upon at receiver end; instead of attempting to transmit the whole momentary demand from the sending station, as all other inventors have hitherto done.

In fact, by the time the flywheel has parted with any large portion of its stored energy, the need for transmitting any accelerating power from the sending end will have been almost entirely met if the valves can be opened quickly enough for the supply of additional working fluid to the prime movers driving the alternators.

The "balance" of acceleration desired can be obtained by having, at receiver end, a second flywheel-alternator whose alternator winding is not brought electrically into the circuit until the contacts of a large circuit breaker have closed together. The operating solenoids, or other operating factors, of this circuit breaker would have their circuit closed by a "time-discriminating" relay of the type disclosed in the above mentioned pending patent application which itself received initiation from the vector difference of potential between the ends of the said alternator winding and those of the motor which drives it (to be described later) or an ordinary relay may be used. The alternator would be set with its electrical axis mechanically in advance (some 20°–30°) of the motor which drives it.

It will be obvious that, if the distance were increased to 1500 miles, or even 2,000 miles, all the "line-kv.-a." troubles would be greatly increased, and the value of the scheme for stored energy at receiver be greatly augmented.

In seeking to produce suitable acceleration, in the exceedingly short interval of time prior to the .06 second mentioned above, the inventor has drawn upon the known fact that, when two groups A and B of synchronous alternators, in two separate stations, are running in parallel, and a sudden load is thrown for example upon group B, the microscopic electrical deceleration of group B causes there to be set up a leading quadrature component of voltage (proportional, at first, to the number of degrees of displacement) which cancels out the reactance between, and including, the machines, and so allows a power current to immediately flow through the lagging machine, operating it as motor, and so accelerating it. Thus synchronism is restored.

Unfortunately, however, this action itself, though ideal, is unsuitable for a very long line, for the simple reason that it does not obtain dimensions suitable for, say, a 1500-mile line until the machines at the two stations are separated by a number of degrees so great that instability is already within sight before any rectification occurs.

It occurred to the inventor (in developing what has been already put forward in the opening remarks) that if, at the overloaded receiving station there could be an alternator coupled to a heavy flywheel, and driven by a small synchronous motor off the receiver end bus bars, and if the electrical axes of the alternator and the motor were coincident under normal conditions, then the vector E. M. F.'s of alternator and motor would also be coincident, and if they were joined by the low-reactance primary coil of a transformer and if the incoming current from the step-down transformer (from the line) were brought to the alternator terminal, no appreciable current should flow into the alternator, since there was no material drop of potential in the line current in passing through the said primary; and since there was a tendency for the potentials of the ends of the windings—both of the generator and motor—to be exactly alike (except as modified by the small inductive drop through the primary), the alternator would then be substantially "floating" on the busbar. This would be the condition before the said momentary increment came on.

The moment, however, that the sudden demand came upon the receiver bus bar, the displacement (phase displacement, coupled with diminished voltage) impressed a quadrature voltage, or nearly quadrature, upon the terminals of the primary of the transformer, and the secondary of the transformer could be arranged to inject a leading quadrature voltage into the circuit received from the line.

The phase-displacement (the deceleration) in the position of the alternator, however, resulted in no material increase in the quadrature boost in the circuit of the alternator winding which would help to cancel out the reactive drop in the said winding; and the deceleration of the alternator caused a lower E. M. F. to be induced and so helped nothing towards cancelling out the reactive drop in the alternator.

It was then perceived that, if the alternator rotor of the "stabilisor" could be arranged to run normally in an "advance" position, then a double purpose would be fulfilled. Firstly, the decelerating of the stabilisor resulted in an increase of the in-phase component of the E. M. F. supplied, as if the alternator winding moved into a stronger field; and, secondly, if we could put the rotor far enough in its "advance" position we could allow for a certain amount of deceleration (displacement) and yet preserve quite a large leading quadrature component in the E. M. F. generated by the alternator coil, and this could be utilised in cancelling out the inductive drop of the stabilisor and in thus permitting a continued and increasing demand to be taken out of the stabilisor without the terminal voltage dropping in phase, or in amount, beyond that desired.

Finally, it was possible, by introducing a quadrature booster as well as an inphase booster, to use the additional voltage of the stabilisor (due to its being in the stronger field) to operate, through the quadrature booster, to generate an additional quadrature E. M. F. in the local circuit of the stabilisor and of the receiver generators, which should cancel out the reactive drops in both; and thus draw still greater currents out of the stabilisor.

Figure 1 shows the arrangement where the stabilisor is running, normally, with its generator electrical axis coincident with that of the motor electrical axis, and Fig. 2 the conditions when the "momentary increment" comes on.

Figs. 4, 4a and 4b show the arrangement (the quadrature booster is not shown) when the stabilisor is running normally with its generator electrical axis advanced perhaps 20° to 30°; and (Figure 4b) the conditions when the "momentary increment" comes on.

Fig. 5 shows diagrammatically the kind of installation to which the invention can be applied;

Fig. 6 is a diagram of connections of the receiving station of Fig. 5 with a stabilizer according to the invention installed;

Fig. 7 is an explanatory diagram to illustrate the steady running conditions;

Fig. 8 is a corresponding diagram to show the effect of a sudden increase of load;

Fig. 11 is a diagrammatic showing of the coupling means.

Figure 4:
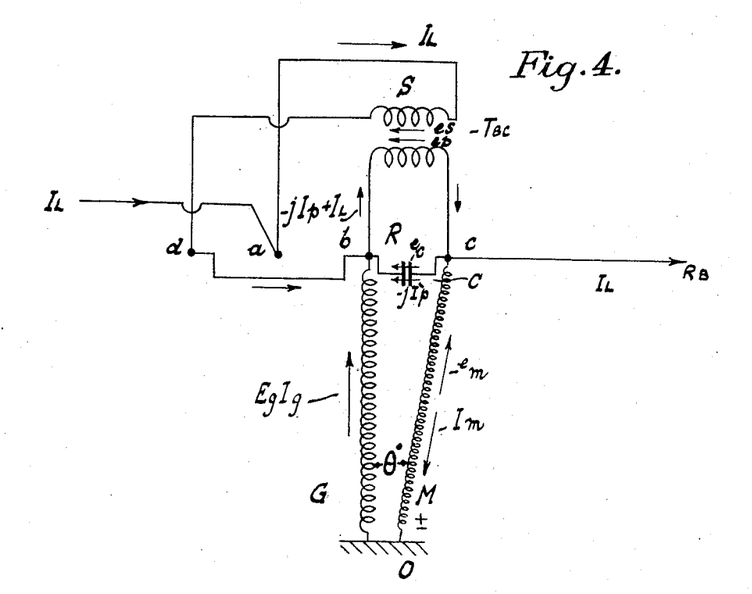
Figure 4A:
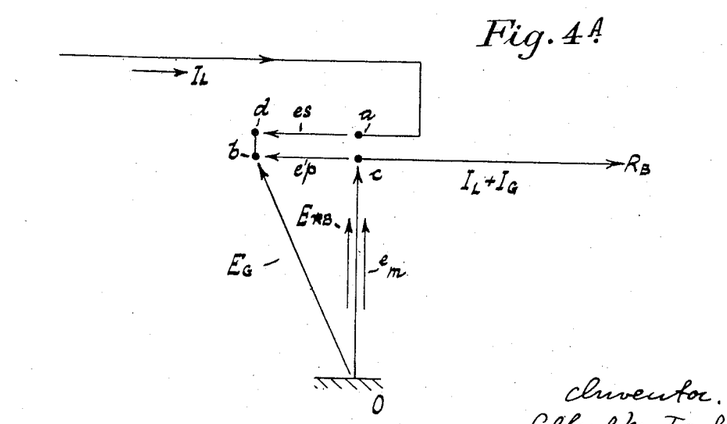
Fig. 4a is a vector diagram applying to Fig. 4; but does not take into account the effect of the quadrature booster.
Figures 4B, 5, 6, 11:
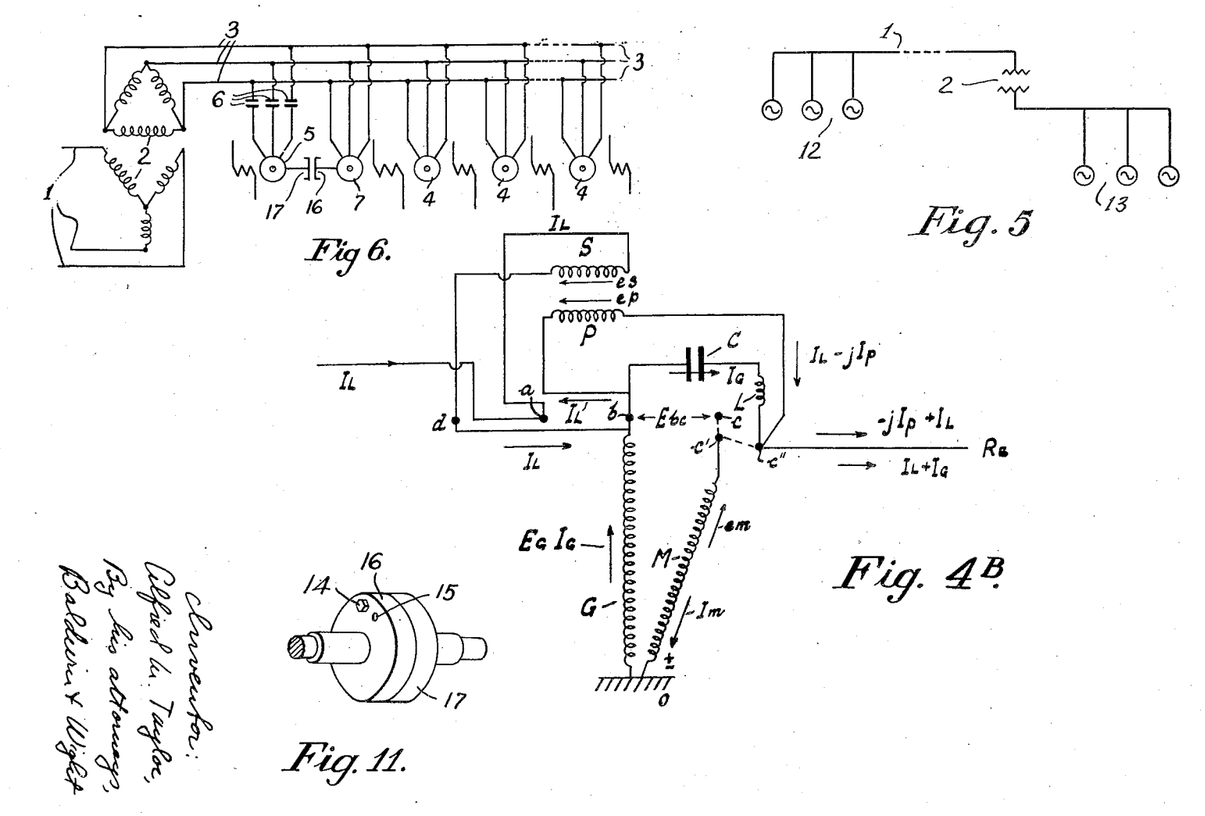

Referring first to Fig. 5, a transmitting station 12 indicated by generators supplies power over a three phase line 1, of which only one phase is shown, to a receiving station 13. The receiving station 12 is shown in Fig. 6 as a diagram of connections. The transmission line 1 feeds a step-down transformer 2 connected to busbars 3, to which are also connected local generators 4, 4.

Figures 1, 2, 7, 8:
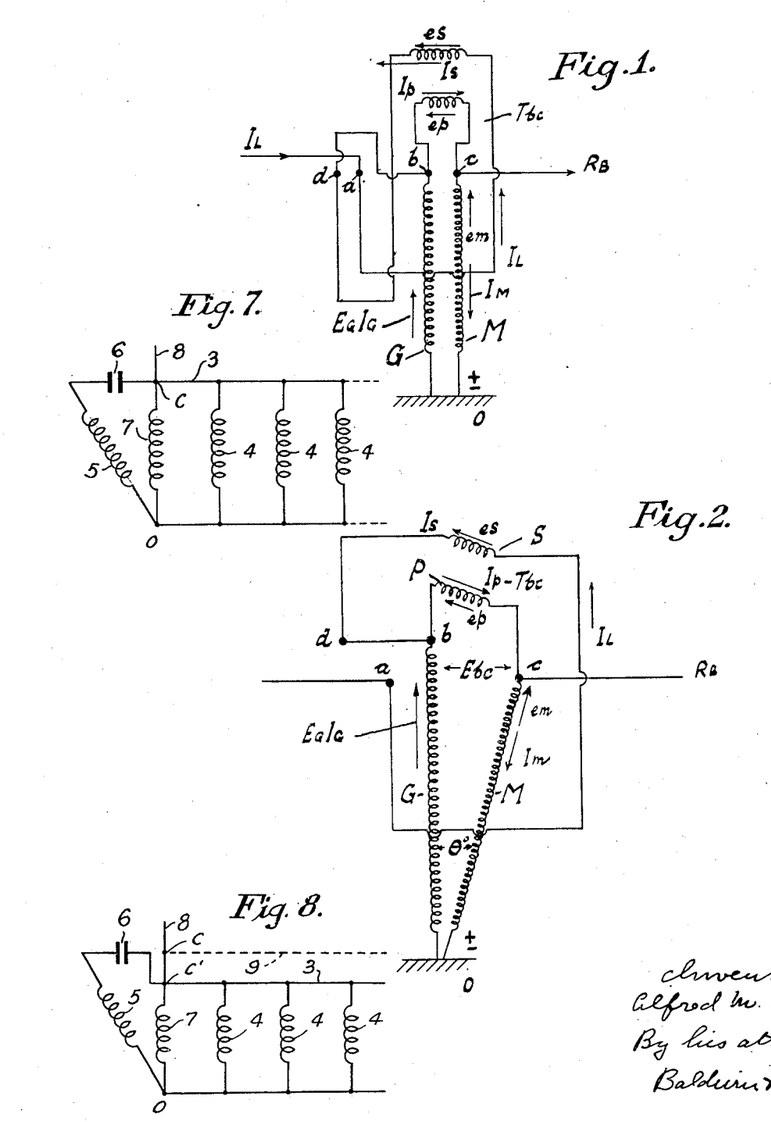

The stabilizer is shown as a synchronous alternator 5 connected through capacitors 6, 6 to the busbars 3. The windings of one phase set at angular positions representing the voltages on the terminals, are shown in Fig. 7, where 8 is the lead from the step-down transformer. Fig. 8 corresponds with Fig. 7 and shows the condition when a sudden increment of load has reduced the busbar voltage to the value represented by the new position of the line 3, the dotted line 9 denoting the old position thereof. At the same time the connecting point c has (in voltage) moved down to c', but the retention of the capacitor 6 in its original position indicates the maintenance at least momentarily of the voltages of the stabilizer alternator 5 and capacitor 6.

Referring now, to Figs. 1 to 4b in a general way:

Fig. 1 shows the association of the generator of the stabilisor G, and the motor M of same, and the inphase transformer, under normal running conditions, i. e. before any phase displacement of the applied voltage, at motor terminals, has occurred.

Fig. 2 shows the same association after the "momentary increment" has come on, and phase-displacement has occurred.

Figures 3, 9, 10:
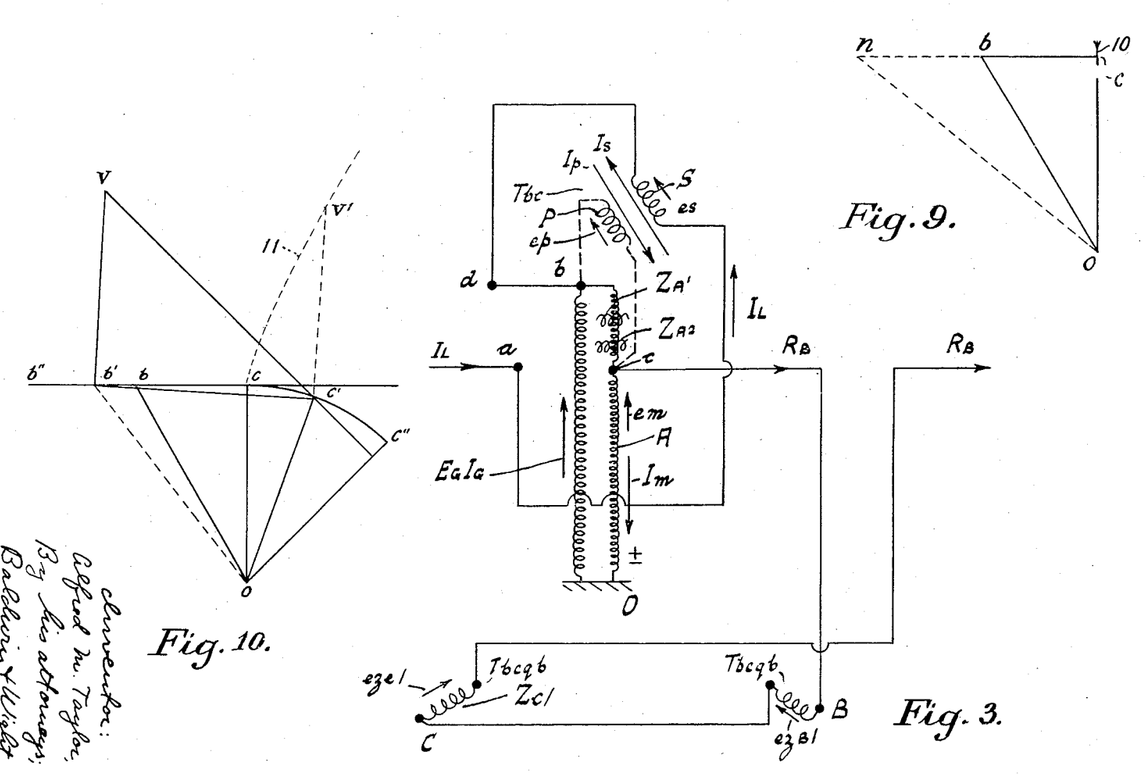
Fig. 3 shows the same as Fig. 2 but with the addition of the quadrature booster.
Fig. 9 is a vector diagram relating to Fig. 7.
Fig. 10 is a corresponding vector diagram relating to Fig. 8.

Fig. 3 shows the same association as before, but with the addition of a quadrature booster; in order to obtain a quadrature leading component of E. M. F. which tends to keep up the terminal voltage of the generator G though subjected to severe momentary overloads; and thus to make it respond actively to these overloads.

Figure 3A:
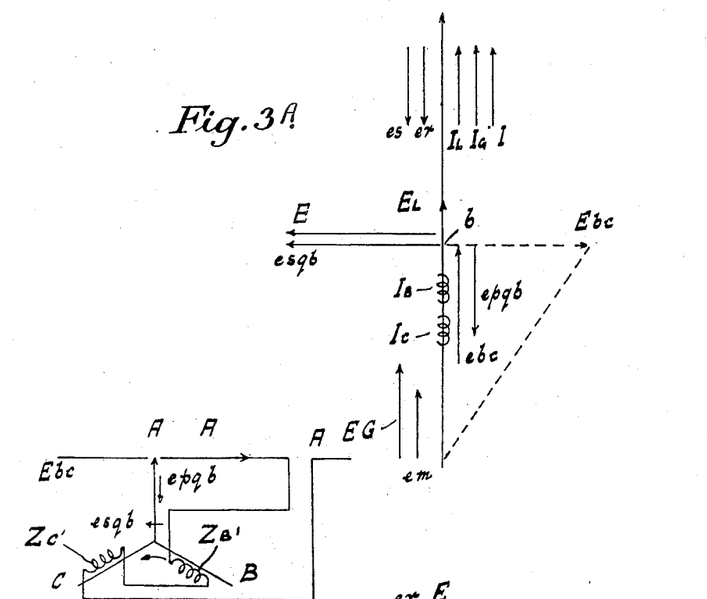
Figs. 3a and 3b are vector diagrams showing action of the system of Fig. 3.

Fig. 3a shows, by a vector diagram, the way in which the quadrature booster helps to generate this leading boost, when the momentary increment pulls down the voltage of the receiver station bus bars R$_B$ without rotating the phase of same.

Figure 3B:
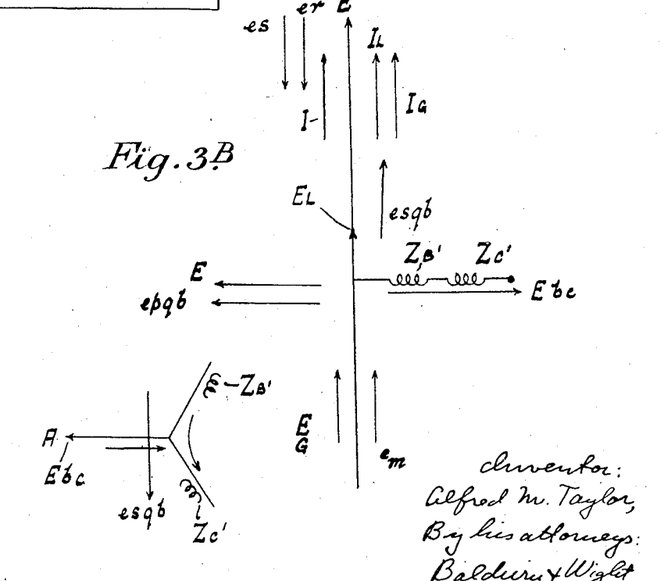

Fig. 3b shows, in a similar way, what happens when the vector voltage of the receiver bus bars is merely rotated clockwise, without reduction in magnitude.

Fig. 4 shows the association of the stabilisor G and the motor M and the inphase transformer, with the addition of a static condenser (capacitor) as a shunt across the terminals of the primary of the inphase transformer; permitting the forward displacement of the electrical axis of the generator when running under normal conditions; so as to have a greater leading component of E. M. F. when under the "momentary increment."

Fig. 4a shows the vector dispositions for the circuit of Fig. 4; with a view to showing how the electrical axis of the generator G can be displaced (mechanically), in a "forward" direction, and yet how the generator may be arranged to simply "float" on the bus bars, in this condition of electrical "advance" without demanding any power from the bus that would cause heating of the generator in normal running and so diminish its capacity to take sudden overloads of a very severe nature. The vector relationships are more clearly shown in Fig. 9, where the arrow 10 represents the phase position of the current circulating in the stabilizer 5, 6, 7. The dotted lines merely show the shape of the diagram if the phase advance is increased from 30° to 50°, b then moving to n.

Fig. 4b shows the association of the stabilisor, motor, inphase transformer (the quadrature booster is omitted, for simplicity), and shunt capacitor, when the stabilisor is discharging heavily into the receiver bus R$_B$; showing how the current through the capacitor is reversed under these conditions; and how the magnetising current of the inphase transformer is now supplied from the stabilisor, instead of from the capacitor.

In Fig. 10 the various magnitudes are picked out from Fig. 4b and plotted in a vector diagram and the curve through which the point c moves to c' and c'' is inserted.

Fig. 11 shows a coupling between the motor and generator of the stabilizer, but only one of the coupling bolts is shown. The bolt 14, which in the normal manner occupies the hole 15 in the motor half 16 of the coupling has been removed and replaced in a hole fifteen electrical degrees away while still occupying the same hole in the generator half 17, the rotors being correspondingly displaced in relation to each other to enable this to be done.

Referring, now, to the drawings in detail:

I$_G$ stands for current of generator G (the generator and the motor, together, form the stabilisor).

I$_L$ stands for line current; after being stepped down in pressure at receiver.

I$_M$ stands for motor current.

I$_p$ stands for "excitation component" of current ($-jI_p$) passing through primary coil of the inphase transformer (the primary coil is also traversed by the line current).

I$_s$ stands for secondary current of inphase transformer (this consists solely of the line current I$_L$).

E$_G$ stands for E. M. F. of generator G.

e$_M$ stands for counter E. M. F. of motor M.

e$_p$ stands for counter E. M. F. of primary of inphase transformer.

e$_s$ stands for secondary E. M. F. of inphase transformer.

T$_{bc}$ stands for inphase transformer whose primary bridges the points b and c.

a, b, c, d, are terminals, or "bus bars."

SE stands for "sending end" (of line).

G stands for generator coil of stabilisor.

M stands for motor of stabilisor.

± stands for neutral terminal, or "bus bar."

θ° stands for the degrees of electrical (clockwise) displacement of the vector of M.

There is not much to explain, in this diagram (Fig. 1). The electrical axis of the generator has not been diverted forwards on the shaft and hence it is coaxial with that of the motor. Consequently, the phases of E. M. F. of the two are both vertical and there is no difference of potential between b and c, except the tiny ohmic drop in the primary coil.

The currents in G and in M being negligible, the points b and c are at equal potentials; because the flux in the transformer is nil; since the primary and secondary ampere-turns balance out.

Referring to Figure 2:

I$_G$, I$_L$, I$_M$, I$_p$, I$_s$, E$_G$, e$_m$, e$_p$, e$_s$, T$_{bc}$, a, b, c, d, S. E., G, M, ±, stand as for Fig. 1, and P stands for primary, and S for secondary, coils of the inphase transformer T$_{bc}$.

E$_{bc}$ is the component of voltage across from b to c, consequent upon the clockwise displacement, and the reduction in magnitude, of the voltage of the receiver station bus bars to which M is directly connected. (The winding M, as already stated, should be inclined to the right, while the winding G should not be slanting, but vertical.) The angle $\theta°$ shown between G and M is caused solely by the deficiency in the voltage of $R_B$, since the winding G, by virtue of its flywheel, remains—both as regards the amount, and the angle, of the vector E. M. F.—exactly at the original voltage obtaining on $R_B$, before the disturbance began.

It will be observed that there is a resultant voltage $E_{bc}$ tending to discharge from the point $b$ to the point $c$, through the primary of the inphase transformer $T_{bc}$ which causes a flux that sets up a counter E. M. F. $e_p$ in the primary, and $E_s$ in the secondary.

It will also be observed that it has been assumed that the inphase drop of the potential of the point C is about 16–20% of the total (initial) voltage of $E_G$; while the clockwise phase-shift of $e_M$ is about 30 degrees. (It will be explained, in connection with Figs. 3a and 3b, that, as far as the quadrature booster is concerned, the best effect is only obtained when the shift of potential of the point $c$ is all downwards and there is no clockwise rotation of the vector of the receiver bus potential.)

The effect of the fall-out of, say, one generator (in five) at the receiver station would introduce nothing appreciably worse than this; nor would any reasonable local short-circuit on the receiver system. The large rotative phase-shift at the receiver only comes into play when a sudden additional load is sought to be passed over the line (a very long line is assumed) so rapidly that there is no time for readjustment of the voltages at the sending end of the line by the insertion of boosters. This may have to be considered when we are dealing with the period after .06 second (since the disturbance began); but the object of the flywheel arrangement of Figs. 1 and 2 is to deal with the period preceding that period; and, owing to the time constant of the line, it is found impracticable to get any large increment of power, from the sending station, along the line, to the receiver station, and hence, we have not got to consider the phase shift at receiver caused by passing large currents through the line, during that early period (0.0 to 0.06 second).

During this period, then, we are faced with the 16–20% drop in inphase potential of the terminal $c$ represented by Fig. 2.

Immediately this begins to occur, however, the generator G commences to discharge heavily into the receiver bus $R_B$. Unfortunately, however, the counter-E. M. F. $e_p$ of the primary of the inphase booster $T_{bc}$ opposes this discharge and reduces it, and, though the secondary imparts a quadrature leading voltage $e_s$ to the voltage received from the sending-end station, this is only partially helpful; and does not assist the generator G to discharge, as heavily as desired, into the receiver bus.

Fig. 3 shows a method of improving this state of affairs, by the use of the quadrature booster $T_{bcqb}$. The greater the inphase drop of the point $c$, the more pronouncedly does the quadrature booster inject a leading quadrature voltage, just in the right place to cause G to discharge heavily into the receiver bus; and the more heavily the greater the drop in potential of the point $c$.

We will refer, later, to Figs. 3a and 3b; but, as these primarily concern the function of the quadrature booster, it will be to the better general understanding of the proposal if we first refer to Figs. 4 and 4b, as these show how it is possible to get practically unlimited output out of the stabilisor, while the increment of power at receiver is still being demanded, without incurring the counter E. M. F. of the primary of the transformer.

Consider, now, Figs. 4, 4a and 4b—

In Fig. 4 the previous symbols still hold; with the exception that the capacitor C is introduced; also the capacitor current $I_{cap}$, and the capacitor (internal) voltage $e_{(cap)}$, and the excitation current $-jI_p$ of the inphase booster primary.

In Fig. 4, which represents the normal condition before the "momentary increment" of load comes on, a new condition has been introduced, viz: to set the generator G upon the shaft with a permanent "advance" of 30–40 electrical degrees; so that even under normal working it will be operating on this "advance." Then, when the real demand for overload comes on, this angle of advance, coupled with any further leading boost due to greater difference of potential across the primary, is available for cancelling the reactance drop in the generator G caused by greater, and yet greater, demands from it.

In this figure, a principle has been introduced which is employed in the inventor's U. S. A. Patent No. 2,180,264; viz., that since the excitation current of a transformer lags by 90° behind the impressed voltage, and since the current in a shunt condenser put across between a line and "ground" leads by 90° over the impressed voltage, it is possible to use the current in the condenser to excite the transformer, without demanding any current from the line for this purpose. So here, if the capacitor is put in of the right size it will absorb just the right excitation current, under the normal running conditions, and no excitation current need be taken from the generator G for the purpose.

But the arrangement, nevertheless, enables us to permit (under normal conditions) a considerable difference of potential between the points $b$ and $c$. And every additional ampere that is allowed (designed) to pass through the primary raises the primary counter-E. M. F. (because it is uncancelled by secondary ampere-turns).

Consequently we can get the necessary value of $e_p$ to prevent the generator G from feeding any amperes into $R_B$ under normal conditions, although $E_G$, by virtue of its axial "advance," contains a large quadrature vector; and hence $E_G$ will "float" on the line, under normal conditions, and we have it ready, and in position, to give a heavy discharge into the receiver bus, when the "momentary increment" comes on.

Now refer to Fig. 4b. Here all the symbols are as in Fig. 4, but the drop in receiver bus voltage has occurred from $c$ to $c''$ as indicated.

There is now nothing but the capacitor C in the immediate path between $b$ and $c''$; but the current which is to be supplied by G into the receiver bus is a "U. P. F." current (by hypothesis, we are dealing only with loads of U. P. F.), and its phase is controlled by the characteristics of the receiver load itself and not by the relatively small voltage across $bc$.

Ignoring, now, (for the moment) the excitation current $-jI_p$—which need not return through the capacitor C—we therefore have the capacitor traversed by a current which is in phase with (or nearly in phase with but actually slightly lagging) the transmission voltage $E_L$. Now it is known that whatever phase of current traverses a static condenser, the voltage internally induced in the condenser leads the current by 90°, hence the voltage $e_{(cap)}$ set up in the condenser will be a quadrature leading voltage with respect to the transmission voltage $E_L$.

In other words, this voltage $e_{cap}$ forms a leading quadrature boost to the transmission voltage, and therefore also to $E_G$, when the latter is looked upon as being cophasal with $E_L$.

Owing, however, to the angular mechanical advance of G, the generated voltage $E_G$ already contains a powerful leading quadrature boost; consequently there is a doubled quadrature boost available, and the generator G will, in fact, be "over-compounded." Not only this, but as it decelerates, and therefore moves into the stronger field, its own inphase voltage will be increased; and thus its voltage will be raised to that, perhaps, at the sending end, giving an exceedingly powerful discharge into $R_B$.

There is therefore every reason to believe that, under the powerful quadrature leading component, not only will the generator G be easily "level-compounded" (more if desired), but there will be sufficient additional leading component to compensate for motors on the system which it is desirable to accelerate, in order to relieve the receiver station of excess load, and enable its generators to get quickly back into synchronism.

It must be remembered, too, that there is a lagging quadrature component of E. M. F. between $b$ and $c$ which will tend to prevent the P. F. of the transmission circuit from retaining U. P. F.; and this must also be cancelled out before the full effect of the leading quadrature component $e_{cap}$ is available for cancelling the internal reactance of the stabilisor.

By the above means the inventor proposes to make each successive output of the stabilisor over-cancel its internal reactance; in such a way that, once the stabilisor has begun to discharge into the receiver bus, it goes on doing so, with each successive increment of its own current, and, by this means, a stabilisor of very low rating, on ordinary standards, may be utilised, at great saving of expense.

As regards the ohmic drop in the stabilisor, this may be met by its movement into the stronger field, as the load comes on.

In view of the good results anticipated from the stabilisor in connection with Fig. 4b, the quadrature booster (mentioned earlier) in connection with Fig. 3 would only be used where the shunted capacitor proved too expensive. It is therefore not proposed to say more about the quadrature booster in this specification.

In those cases where it may be found desirable to continue, if possible, to provide the very large accelerating power required for completely maintaining synchronism between the sending and receiving ends of the line, in the interval following the first .06 second (instead of transmitting the power from the sending end), I would provide a second stabilisor, differing from that already described in that the "free" end of the generator G is not joined up to any point of the receiver system in normal running; but the establishment of a potential difference between the points $b$ and $c$ would be caused to operate a rapid relay, in a well-known manner, and this relay would close contacts in the trip-coil circuit of a powerful circuit-breaker, the closing of whose contacts would introduce the stabilisor on to the point $b$ or $c$ of Fig. 4b.

The new stabilisor might, under these conditions (not having to "float"), be excited normally to give a voltage which was definitely in excess of the normal voltage on the point $b$ or $c$ and any desired "angle of advance," over that of its motor, could be given to the stabilisor; so that it would possess all the "quadrature voltage component" features of the "floating" stabilisor; yet secured without the aid of any capacitor, thus greatly cheapening same.

In lines that were shorter than 750 miles, it is probable that the "floating" stabilisor could be done away with altogether, and only the "breaker-closed" stabilisor employed. The reason for employing the "floating" stabilisor is that, on lines of extreme length (say 1500 miles), no accelerating power whatever can be efficiently obtained from the sending end station, in the first .06 second; and, if the disturbance happens to be a very severe one, synchronism between the two ends may be so disturbed in that interval, that it cannot be regained without enormous kv.-a. losses in the line. In such a case, the immediate introduction of very great accelerating power from the flywheel of a "floating" stabilisor may just save the situation; and its continuation, by means of a "breaker-closed" stabilisor, would certainly do so.

It may further be explained that, in those systems which introduce a leading quadrature boost into the line, such as the inventor's 2,180,264, the boost cancels out the reactance of the line. But the introduction of the boost, on lines of 750–1500 miles, involves other problems (cannot be discussed here) and, if not introduced sufficiently rapidly, or powerfully, the curve connecting angle (of acceleration) with time creeps up (at first slowly and later very much more rapidly) until suddenly it curls over upwards and backwards, and synchronism is broken.

In many cases, a balance between acceleration and deceleration is very ambiguously defined, and a shade more acceleration, applied at any time not more than 0.10 to 0.15 second from the start of the disturbance, would just turn the balance (though very slowly) and deceleration would begin and synchronism ultimately would be regained—but perhaps not till after 0.20 or even 0.30 second.

What the present inventor has in mind is: that if, by taking energy out of the flywheel at receiver end during the first .06 second, followed by another period (which, this time, might run into .10 second) during which a "breaker-closed" stabilisor was employed, the receiver-generator speed might have been so regained during this total 0.16 second that a comparatively slight accelerating power (now transmitted by the inventor's quadrature booster), sent from the sending end, would now give the above-mentioned "shade more"; and acceleration (of sending end generator) could now slowly be turned into deceleration. It will be understood that each successive momentary cancellation of the reactance of the line continues to take away the disturbing cause; but the longer the line the more important it is to have something which acts instantly. Now the arrangements described in the present specification do not remove the reactance from the line (which unfortunately still remains, if we have to pass any accelerating power over it); but they do remove the accelerating power which would otherwise have to be passed over the line. Consequently, the smaller accelerating power which has now to be transmitted demands, (from systems such as the present inventor's application 501,571), performances which one can easily respond to and the same transmitted accelerating power that was demanded for a 750 mile line now becomes operative for a 1500 mile line, even though the disturbance may last much longer.

What I claim is:

1. In a polyphase system for transmitting electric power over long distances including a sending station with synchronous generating machinery and a receiving station with synchronous machinery normally connected to bus bars, a stabiliser at the receiving station comprising a synchronous generator of substantial output in relation to the synchronous machinery at that station, a synchronous motor and coupling means between the said generator and motor so set that the voltage produced by the generator is ahead in phase of the internal voltage of the motor by about 30° to 90°, connections between the motor and the bus bars for supplying driving power to the motor, and connections between the generator and the bus bars by which current can be fed from the generator to the bus bars in the event of a sudden occurrence tending to throw the synchronous machinery at the receiving station out of phase with that at the sending station.

2. In a polyphase system for transmitting electric power over long distances including a sending station with synchronous generating machinery and a receiving station with synchronous machinery normally connected to bus bars, a stabiliser at the receiving station comprising a synchronous generator of substantial output in relation to the synchronous machinery at that station and designed normally to provide a higher voltage than the said machinery, a synchronous motor and coupling means between the said generator and motor so set that the voltage produced by the generator is ahead in phase of the internal voltage of the motor by about 30° to 90°, connections between the motor and the bus bars for supplying driving power to the motor, and connections between the generator and the bus bars by which current can be fed from the generator to the bus bars in the event of a sudden occurrence tending to throw the synchronous machinery at the receiving station out of phase with that at the sending station.

3. In a polyphase system for transmitting electric power over long distances including a sending station with synchronous generating machinery and a receiving station with synchronous machinery normally connected to bus bars, a stabiliser at the receiving station comprising a synchronous generator of substantial output in relation to the synchronous machinery at that station, a synchronous motor and coupling means between the said generator and motor so set that the voltage produced by the generator is ahead in phase of the internal voltage of the motor by about 30° to 90°, connections between the motor and the bus bars for supplying driving power to the motor, and connections between the generator and bus bars including a series capacitor by which current can be fed from the generator to the bus bars in the event of a sudden occurrence tending to throw the synchronous machinery at the receiving station out of phase with that at the sending station.

4. In a polyphase system for transmitting electric power over long distances including a sending station with synchronous generating machinery and a receiving station with synchronous machinery normally connected to bus bars, a stabiliser at the receiving station comprising a synchronous generator of substantial output in relation to the synchronous machinery at that station and designed normally to provide a voltage about 14½% in excess of the voltage of the said machinery, a synchronous motor and coupling means between the said generator and motor so set that the voltage produced by the generator is about 30° ahead in phase of the internal voltage of the motor, connections between the motor and the bus bars for supplying driving power to the motor, connections between the generator and the bus bars, and a series capacitor interposed in said last-named connections and of such value that in normal steady running the current passing through the generator when the voltage of the latter is about 30° ahead of the bus bar voltage is approximately equal to its normal rated current.

ALFRED MILLS TAYLOR.

REFERENCES CITED

The following references are of record in the file of this patent:

UNITED STATES PATENTS

| Number | Name | Date |
|---|---|---|
| 1,909,137 | Thompson | May 16, 1933 |